United States Patent
Lee et al.

(10) Patent No.: US 9,204,079 B2
(45) Date of Patent: Dec. 1, 2015

(54) METHOD FOR PROVIDING APPRECIATION OBJECT AUTOMATICALLY ACCORDING TO USER'S INTEREST AND VIDEO APPARATUS USING THE SAME

(75) Inventors: Hye-jeong Lee, Seoul (KR); Ji-hye Chung, Seoul (KR); Byuk-sun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 12/629,947

(22) Filed: Dec. 3, 2009

(65) Prior Publication Data
US 2010/0186026 A1 Jul. 22, 2010

(30) Foreign Application Priority Data
Jan. 16, 2009 (KR) .......................... 10-2009-003865

(51) Int. Cl.
| | |
|---|---|
| *H04N 7/173* | (2011.01) |
| *H04N 5/445* | (2011.01) |
| *H04N 21/45* | (2011.01) |
| *H04N 21/431* | (2011.01) |
| *H04N 21/442* | (2011.01) |
| *H04N 21/8549* | (2011.01) |
| *H04N 5/45* | (2011.01) |

(52) U.S. Cl.
CPC ....... *H04N 5/44543* (2013.01); *H04N 21/4312* (2013.01); *H04N 21/44222* (2013.01); *H04N 21/4532* (2013.01); *H04N 21/8549* (2013.01); *H04N 5/45* (2013.01)

(58) Field of Classification Search
USPC .......................................... 725/46, 10, 12, 14
See application file for complete search history.

(56) References Cited

U.S. PATENT DOCUMENTS

| | | | |
|---|---|---|---|
| 6,944,877 B1 * | 9/2005 | Lord et al. ...................... | 725/32 |
| 7,237,251 B1 | 6/2007 | Oz et al. | |
| 7,360,160 B2 * | 4/2008 | Matz .............................. | 715/716 |
| 8,291,326 B2 * | 10/2012 | Sakai et al. .................... | 715/753 |
| 2003/0115585 A1 * | 6/2003 | Barsness et al. .................. | 725/9 |
| 2003/0196211 A1 * | 10/2003 | Chan .............................. | 725/131 |
| 2004/0250272 A1 * | 12/2004 | Durden et al. .................. | 725/25 |
| 2005/0223237 A1 * | 10/2005 | Barletta et al. ................ | 713/186 |

(Continued)

FOREIGN PATENT DOCUMENTS

| | | |
|---|---|---|
| JP | 2005-250322 A | 9/2005 |
| JP | 2006-277192 A | 10/2006 |

(Continued)

OTHER PUBLICATIONS

Lee, Jeong-Min et al. "A Content Site Management Model by Analyzing User Behavior Patterns" 2005, p. 539-541.

(Continued)

*Primary Examiner* — Pankaj Kumar
*Assistant Examiner* — Reuben M Brown
(74) *Attorney, Agent, or Firm* — Sughrue Mion, PLLC (57) ABSTRACT

A method for automatically providing an appreciation object based on a user's interest and a video apparatus using the method are provided. The method includes providing the appreciation object if it is determined that a user is less interested in a viewing object currently being provided. Therefore, it is possible to promote appreciation of the appreciation object created based on currently stored content, and to provide the user with entertainment through appreciation of the appreciation object.

21 Claims, 7 Drawing Sheets

(56) References Cited

U.S. PATENT DOCUMENTS

| | | | |
|---|---|---|---|
| 2007/0162922 A1* | 7/2007 | Park | 725/10 |
| 2007/0201824 A1 | 8/2007 | Masaki et al. | |
| 2008/0127247 A1 | 5/2008 | Allen et al. | |
| 2008/0127262 A1 | 5/2008 | Neufeld et al. | |
| 2009/0077195 A1* | 3/2009 | Gibbs et al. | 709/217 |
| 2009/0254424 A1* | 10/2009 | Swanson | 705/14 |
| 2009/0293080 A1* | 11/2009 | Ramanathan et al. | 725/20 |
| 2009/0313295 A1* | 12/2009 | Blaxland et al. | 707/103 R |
| 2010/0070987 A1* | 3/2010 | Amento et al. | 725/10 |
| 2011/0072448 A1* | 3/2011 | Stiers et al. | 725/10 |
| 2011/0282745 A1* | 11/2011 | Meoded et al. | 705/14.61 |

FOREIGN PATENT DOCUMENTS

| | | |
|---|---|---|
| JP | 2007214663 A | 8/2007 |
| JP | 2008-103802 A | 5/2008 |
| KR | 10-2005-0049418 A | 5/2005 |
| KR | 10-2005-0077427 A | 8/2005 |
| WO | 2010/049932 A1 | 5/2010 |

OTHER PUBLICATIONS

Communication dated Jun. 25, 2013, issued by the Japanese Patent Office in counterpart Japanese Application No. 2010-001919.
Communication from the European Patent Office issued Feb. 28, 2013 in counterpart European Application No. 09178010.6.
Communication dated May 22, 2014 issued by the European Patent Office in counterpart European Patent Application No. 09178010.6.
Communication dated Jan. 20, 2015, issued by the Korean Intellectual Property Office in counterpart Korean Application No. 10-2009-0003865.
Communication dated May 12, 2015, issued by the Japanese Patent Office in counterpart Japanese Application No. 2010-1919.

* cited by examiner

METHOD FOR PROVIDING APPRECIATION OBJECT AUTOMATICALLY ACCORDING TO USER'S INTEREST AND VIDEO APPARATUS USING THE SAME

CROSS-REFERENCE TO RELATED APPLICATIONS

This application claims priority from Korean Patent Application No. 10-2009-0003865, filed on Jan. 16, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to providing an appreciation object, and more particularly, to creating an appreciation object and providing a user with the created appreciation object so that the user may appreciate the appreciation object using a video apparatus.

2. Description of the Related Art

The development of digital media has brought an exponential increase in an amount of content which people have and hold. However, people hold too much content or it is cumbersome for them as they have to play back and appreciate content, and thus they do not nearly appreciate content.

Additionally, users directly view photographs included in albums, but it is difficult for users to directly view a variety of content stored in a storage medium. This also causes a decrease in the frequency of appreciation of content.

Accordingly, if users only store content and do not appreciate the stored content, it is of no use to have the content. Therefore, there is a need for methods for promoting appreciation of content.

The concept of virtual channels has been introduced so that users may continue to view desired broadcast programs. Such virtual channels do not exist in reality and have their own numbers assigned by users. In more detail, users need to manually assign numbers of virtual channels, and the numbers assigned by users are used to call corresponding virtual channels.

However, virtual channels provide broadcast programs instead of stored content, and users need to select a broadcast program, assign numbers to virtual channels or call a desired virtual channel. Accordingly, the use of virtual channels causes inconvenience to users.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments provide a method for automatically providing an appreciation object created based on currently stored content when a user is less interested in a viewing object, which is currently provided, and a video apparatus using the method, in order to provide the user with the currently stored content at appropriate time.

According to an aspect of the present invention, there is provided a method for automatically providing an appreciation object using a video apparatus, the method comprising determining a user's interest in a viewing object which is currently being provided on a video output unit of the video apparatus; and providing an appreciation object, other than the viewing object, on the video output unit if it is determined that the user's interest is less than a reference level.

The determining may comprise the determining comprises determining the user's interest while a user manipulates the video apparatus The providing may comprise providing the appreciation object without temporally or spatially covering the viewing object on the video output unit.

The appreciation object may not temporally disturb the user's viewing of the viewing object in at least one situation of the following: a situation in which a main part of the viewing object is not covered by the appreciation object; a situation in which one or more items appearing on the viewing object are not covered by the appreciation object; and a situation in which the appreciation object is displayed in the same form as the one or more items appearing on the viewing object.

The appreciation object may not spatially disturb the user's viewing of the viewing object in at least one situation of the following: a situation in which the appreciation object is provided between one or more scenes of the viewing object; a situation in which the appreciation object is provided between one or more pieces of broadcast content which are continuously changed by channel zapping; a situation in which the appreciation object is provided between one or more pieces of content which are continuously changed by zapping of external inputs; and a situation in which the appreciation object is provided between one or more pieces of content which are continuously changed by zapping of stored content.

The providing may comprise, if it is determined that the user's interest is less than the reference level, setting a duration of the appreciation object, creating the appreciation object based on the set duration, and providing the created appreciation object.

The setting may comprise setting the duration of the appreciation object based on at least one of a period of time from a current time to a user's scheduled time and a previous appreciation time.

The user's scheduled time may be at least one of the following: a time at which broadcast content scheduled for viewing begins; a time at which another viewing object scheduled for viewing begins to play back; and the user's favorite broadcast content begins.

The determining may comprise determining that the user's interest is less than the reference level in at least one situation of the following: 1) a situation in which the user performs channel zapping; 2) a situation in which the user performs zapping of external inputs; 3) a situation in which the user performs zapping of stored content; 4) a situation in which the user performs manipulation which is not required to view the viewing object; 5) a situation in which the user manipulates an electronic program guide (EPG) for a predetermined period of time or longer; and 6) a situation in which a predetermined pattern of user action is detected.

The appreciation object may comprise at least one content related to the user.

The appreciation object may comprise at least one content which has a preference of the user greater than a first reference level and a recent appreciation frequency of the user less than a second reference level.

The providing may comprise inducing the user to appreciate the appreciation object if it is determined that the user's interest is less than the reference level, and providing the appreciation object if the user agrees to appreciate the appreciation object.

The providing may comprise inducing the user to view the appreciation object in such a manner as not to disturb the user's viewing of the viewing object.

According to another aspect of the present invention, there is provided a video apparatus comprising a video output unit which provides a viewing object, and a controller which determines a user's interest in the viewing object which is currently being provided by the video output unit, and controls the video output unit to provide an appreciation object other than the viewing object if it is determined that the user's interest is less than a reference level.

The controller may control the video output unit to provide the appreciation object without temporally or spatially covering the viewing object.

The appreciation object may not temporally disturb the user's viewing of the viewing object in at least one situation of the following: a situation in which a main part of the viewing object is not covered by the appreciation object; a situation in which one or more items appearing on the viewing object are not covered by the appreciation object; and a situation in which the appreciation object is displayed in the same form as the one or more items appearing on the viewing object.

The appreciation object may not spatially disturb the user's viewing of the viewing object in at least one situation of the following: a situation in which the appreciation object is provided between one or more scenes of the viewing object; a situation in which the appreciation object is provided between one or more pieces of broadcast content which are continuously changed by channel zapping; a situation in which the appreciation object is provided between one or more pieces of content which are continuously changed by zapping of external inputs; and a situation in which the appreciation object is provided between one or more pieces of content which are continuously changed by zapping of stored content.

If it is determined that the user's interest is less than the reference level, the controller may set a duration of the appreciation object, may create the appreciation object based on the set duration, and may control the video output unit to provide the created appreciation object.

The controller may set the duration of the appreciation object based on at least one of a period of time from a current time to a user's scheduled time and a previous appreciation time.

The user's scheduled time may be at least one of the following: a time at which broadcast content scheduled for viewing begins; a time at which another viewing object scheduled for viewing begins to play back; and the user's favorite broadcast content begins.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
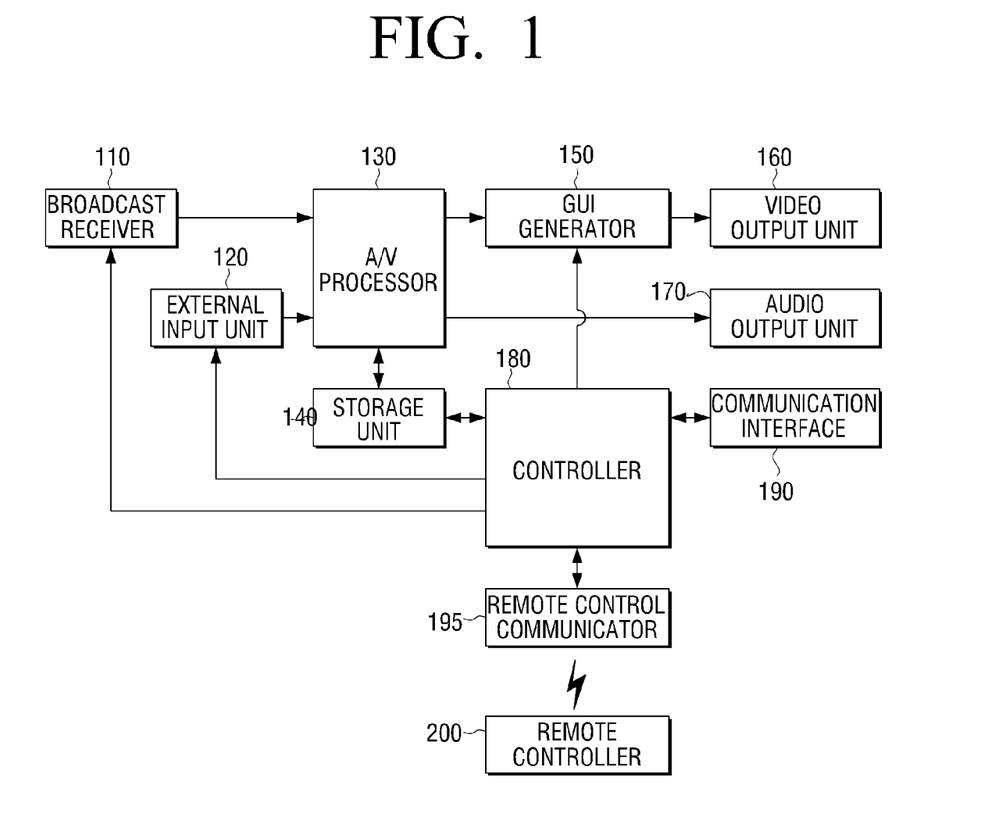
FIG. 1 is a block diagram of a digital television (DTV) according to an exemplary embodiment.

FIG. 1 is a block diagram of a digital television (DTV) according to an exemplary embodiment. The DTV of FIG. 1 comprises a broadcast receiver 110, an external input unit 120, an audio/video (A/V) processor 130, a storage unit 140, a graphical user interface (GUI) generator 150, a video output unit 160, an audio output unit 170, a controller 180, a communication interface 190 and a remote control communicator 195.

The broadcast receiver 110 receives broadcast content from a broadcast station or a satellite via wire or wirelessly, and demodulates the received broadcast content. The external input unit 120 receives content from an external apparatus connected to the DTV. The storage unit 140 comprises a recording medium in which content is stored.

The A/V processor 130 performs signal processing, such as video decoding, video scaling or audio decoding, with respect to the broadcast content output from the broadcast receiver 110. The A/V processor 130 transfers a video signal and an audio signal to the GUI generator 150 and the audio output unit 170, respectively.

The A/V processor 130 also performs signal processing on the content received by the external input unit 120 and the content read by the storage unit 140.

The GUI generator 150 generates a GUI to be shown on the video output unit 160, and adds the generated GUI to video output from the A/V processor 130. The operation by which the GUI generator 150 generates the GUI is controlled by the controller 180 that will be described below.

The video output unit 160 displays the video to which the GUI is added and which is output from the GUI generator 150. The audio output unit 170 outputs audio transmitted from the A/V processor 130 through a speaker.

The controller 180 controls the overall operations of the DTV according to user manipulation commands transmitted from a remote controller 200 via the remote control communicator 195. Additionally, the controller 180 may access an external apparatus or an external network through the communication interface 190 via wire or wirelessly.

The controller 180 controls the GUI generator 150 to generate a GUI representing information requested by a user. Additionally, the controller 180 creates an appreciation object using the content stored in the storage unit 140, and stores the created appreciation object in the storage unit 140.

Figure 2:
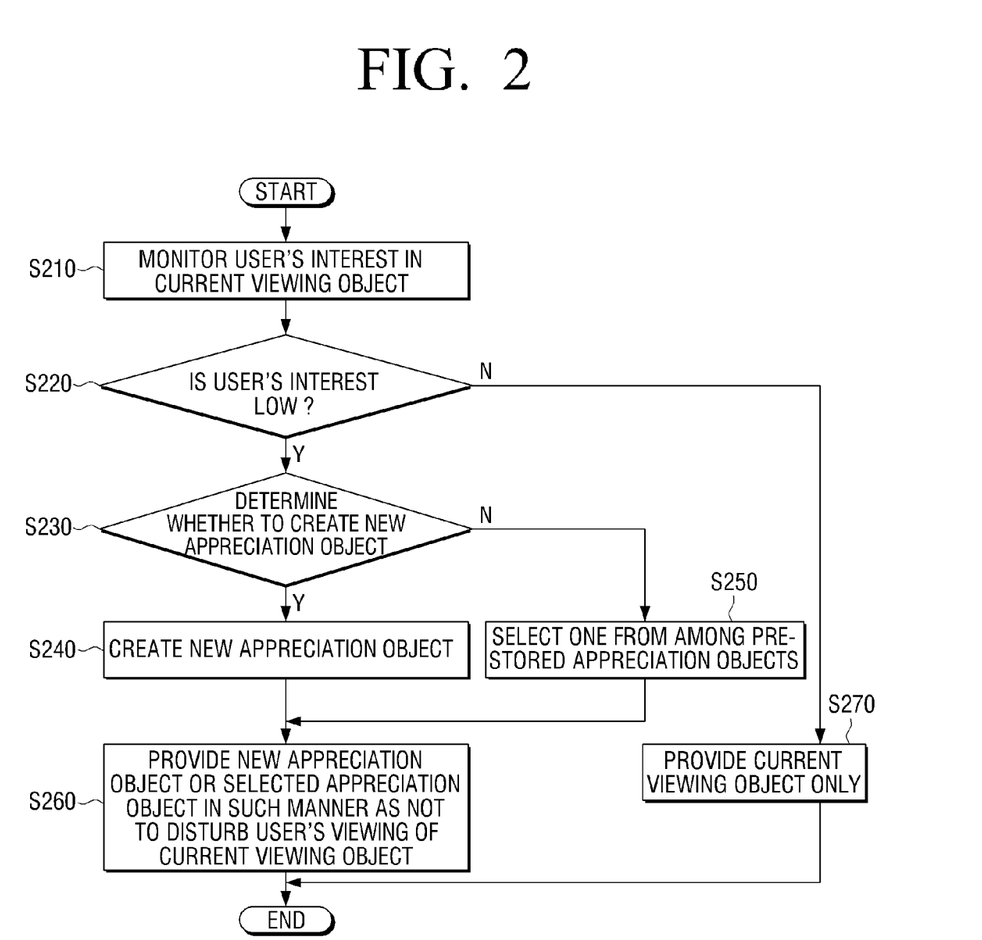
FIG. 2 is a flowchart explaining a method for automatically providing an appreciation object according to an exemplary embodiment.

If it is determined that a user is less interested in a 'viewing object which is currently being provided' (hereinafter, is referred to as a 'current viewing object'), the controller 180 controls the GUI generator 150 to generate a GUI representing an appreciation object. This operation is now described in detail with reference to FIG. 2. FIG. 2 is a flowchart explaining a method for automatically providing an appreciation object according to an exemplary embodiment.

In FIG. 2, the controller 180 monitors a user's interest in the 'current viewing object' (S210). In operation S210, the 'current viewing object' refers to content currently being output from the video output unit 160 and the audio output unit 170.

This content may be not only broadcast content (namely, a broadcast program) received by the broadcast receiver 110, but also content received from the external apparatus by the external input unit 120 or content stored in the storage unit 140. In other words, any content capable of being currently output through the video output unit 160 and the audio output unit 170 may be a 'current viewing object'.

Additionally, the current viewing object may comprise not only content but also a screen showing an electronic program guide (EPG), a widget, an external input list or a menu.

The user's interest represents how much a user is concerned about or interested in the current viewing object, and may be determined by the user's manipulation. In other words, the controller 180 may check which manipulation is performed by the user to determine the user's interest.

For example, if a user zaps channels, the controller 180 may determine that the user is less interested in the current viewing object, that is, the user's interest is less than a reference level. In this situation, channel zapping refers to continuing to change channels rather than continuously viewing content on a single channel.

Likewise, if a user zaps external inputs or stored content, the controller 180 may also determine that the user is less interested in the current viewing object. In this situation, zapping of external inputs refers to continuing to change external inputs, and zapping of stored content refers to continuing to change content to be played back.

Additionally, if a user performs manipulations which are not required to view the current viewing object, the controller 180 may also determine that the user is less interested in the current viewing object. A user's manipulations required to view the current viewing object may comprise, for example, adjusting the volume, the screen ratio and the screen brightness. A user's manipulations not required to view the current viewing object may comprise, for example, setting the current time and setting to lock channels.

Furthermore, if a user calls an EPG and searches for desired broadcast content using the EPG, the controller 180 may also determine that the user is less interested in the current viewing object.

As a result of monitoring the user's interest in operation S210, if it is determined that the user is very interested in the current viewing object (S220-N), the controller 180 continues to provide the user with the current viewing object only (S270), because the user continues to view the current viewing object with great interest.

Operation S220-N has no relevance to the exemplary situations described above.

On the other hand, if it is determined that the user is less interested in the current viewing object as a result of monitoring the user's interest in operation S210 (S220-Y), the controller 180 provides the user with appreciation objects other than the current viewing object (S230 to S260).

Before providing appreciation objects, the controller 180 determines whether to create a new appreciation object to be provided to the user (S230).

Determination on whether to create a new appreciation object (S230) may be performed 1) in a random manner or 2) according to a predetermined reference. Herein, the predetermined reference may be set as occasion demands, for example i) if a user has already appreciated all the created appreciation objects lastly (for example, within a week), or ii) if a user holds more than 100 appreciation objects, the controller 180 may determine not to create a new appreciation object.

If it is determined not to create a new appreciation object (S230-N), the controller 180 selects one from among a plurality of appreciation objects which are previously stored in the storage unit 140 (S250).

The plurality of appreciation objects may be selected in various ways. In more detail, the controller 180 may select one from among the plurality of appreciation objects according to a user's preference and according to a user's recent appreciation frequency which indicates how frequently the user has recently appreciated an appreciation object. For example, the controller 180 may select an appreciation object with a low recent appreciation frequency from among appreciation objects with four (4) points or greater out of five (5) points indicating the highest preference level.

Figure 3:
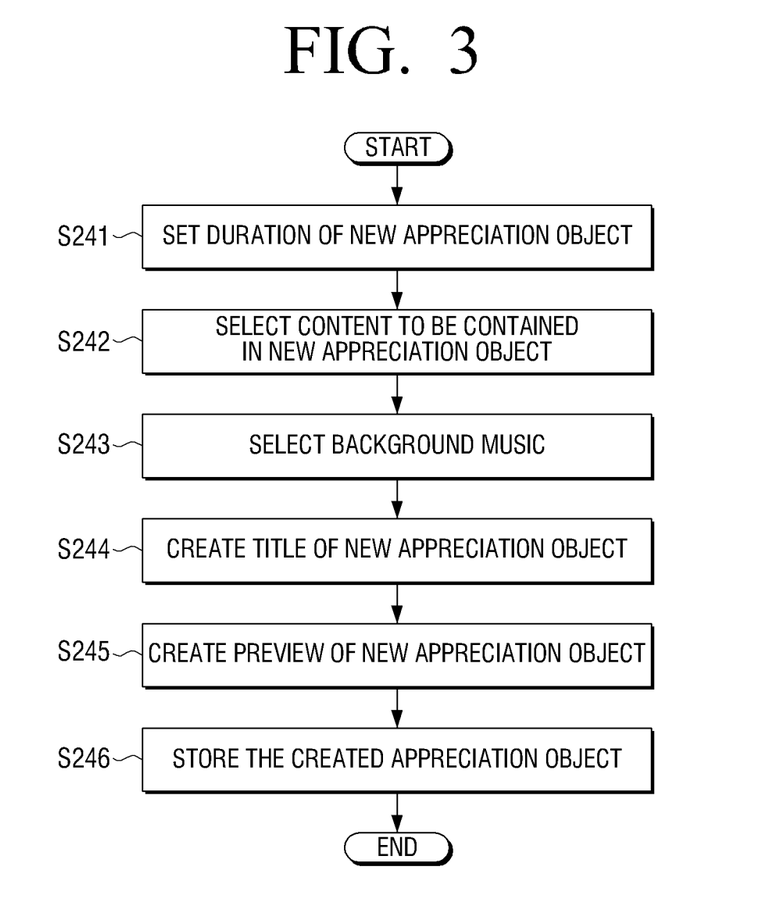
FIG. 3 is a detailed flowchart explaining an appreciation object creation operation shown in FIG. 2, according to an exemplary embodiment.

If it is determined to create a new appreciation object (S230-Y), the controller 180 creates a new appreciation object (S240). Hereinafter, a process of creating an appreciation object is described in detail with reference to FIG. 3. FIG. 3 is a detailed flowchart of operation S240 shown in FIG. 2.

After determining to create a new appreciation object (S230-Y), the controller 180 sets duration of the new appreciation object to be created (S241).

The duration of the new appreciation object may be set in various ways which are described below.

First, the duration of the new appreciation object may be computed based on the time at which broadcast content is scheduled for viewing. For example, if the broadcast content is scheduled to begin at 16:00 when the current time is 15:50, the duration of the new appreciation object may be set to less than 10 minutes, in order to enable a user to view the scheduled broadcast content after appreciating the entire appreciation object.

Second, the duration of the new appreciation object may be set based on the average appreciation time. For example, if a user appreciates an appreciation object on the average 15 minutes previously, the duration of the new appreciation object may be set to less than 15 minutes.

Additionally, the duration of the new appreciation object may be set by both the two ways. For example, 1) if it averagely takes 15 minutes to appreciate a single appreciation object and if 10 minutes left until the broadcast content scheduled for viewing begins, the duration of the new appreciation object may be set to less than 10 minutes. However, 2) if it averagely takes 15 minutes to appreciate a single appreciation object and if 20 minutes left until the broadcast content scheduled for viewing begins, the duration of the new appreciation object may be set to less than 15 minutes.

After operation S241, the controller 180 selects content to be contained in the new appreciation object based on the set duration of the new appreciation object (S242).

In operation S242, the selected content may be 1) photographs or 2) moving images, or 3) both photographs and moving images.

Additionally, content related to a user may be selected to be contained in the new appreciation object. In other words, the content related to the user may be content which is created by the user and in which the user or user's family, friends or coworkers appear.

Content to be contained in the new appreciation object may be selected in various ways which are described below.

First, content to be contained in the new appreciation object may be selected in the same manner as selection of appreciation objects in operation S250. In other words, the user's preference and the user's recent appreciation frequency may be used to select content to be contained in the new appreciation object. For example, the controller 180 may select content with a low recent appreciation frequency from among content with four (4) points or greater out of five (5) points indicating the highest preference level.

In this situation, the selected content may be correlated with one another. For example, content having a similar creation date, content having a similar name and content confirmed to have correlation using information recorded in metadata may be selected together. If the controller 180 selects content correlated with one another, the new appreciation object may comprise, for example content regarding the celebration of a baby's first birthday or content regarding a graduation ceremony of an elementary school.

Second, content to be contained in the new appreciation object may be selected according to a user's appreciation frequency. In more detail, content with a low appreciation frequency may be selected to be contained in the new appreciation object, which makes a user feel interesting.

Additionally, if an appreciation object is provided based on a template, the selected content may be adjusted. For example, when an appreciation object is provided through a template capable of showing seven pieces of content at once, if 10 pieces of content are selected, three pieces of content may be excluded or four pieces of content may be additionally selected.

In this situation, one or more pieces of content in which a similar background scene appears or in which hand blur occurs may be excluded.

After operation S242, the controller 180 selects background music (S243). In this situation, a piece of music content is selected as background music from among a plurality of pieces of music content stored in the storage unit 140 in the same manner as selection of content in operation S242.

Subsequently, the controller 180 creates a title of the new appreciation object (S244). In more detail, the controller 180 may create the title of the new appreciation object using words which are commonly recorded in metadata of the selected content or words which are most frequently used in metadata of the selected content.

Additionally, the controller 180 creates a preview of the new appreciation object (S245). If photographs are selected in operation S242, the controller 180 may reduce the size of one of the selected photographs or turn the selected photographs in a slideshow to create a preview.

Alternatively, if moving images are selected in operation S242, the controller 180 may reduce the size of the first scene of one of the selected moving images or turn the first scenes of the selected moving images into a slideshow to create a preview.

Therefore, the new appreciation object is completely created through operations S241 to S245. Subsequently, the controller 180 stores the new appreciation object in the storage unit 140 (S246).

The stored appreciation object may be selected in operation S250.

Operation S240 has been described in detail with reference to FIG. 3. Referring back to FIG. 2, operation S260 of providing an appreciation object is performed after operations S240 and S250.

In operation S260, the new appreciation object created in operation S240 or the appreciation object selected in operation S250 may be provided in such a manner as not to disturb a user's viewing of the current viewing object.

In more detail, the controller 180 controls the GUI generator 150 to generate a GUI representing the new appreciation object or the selected appreciation object in order to provide the new appreciation object or the selected appreciation object in such a manner as not to temporally or spatially disturb a user's viewing of the current viewing object.

To prevent the user's viewing of the current viewing object from being temporally disturbed, the appreciation object may be provided together with the current viewing object so as not to cover a main part of the current viewing object.

Figure 4:
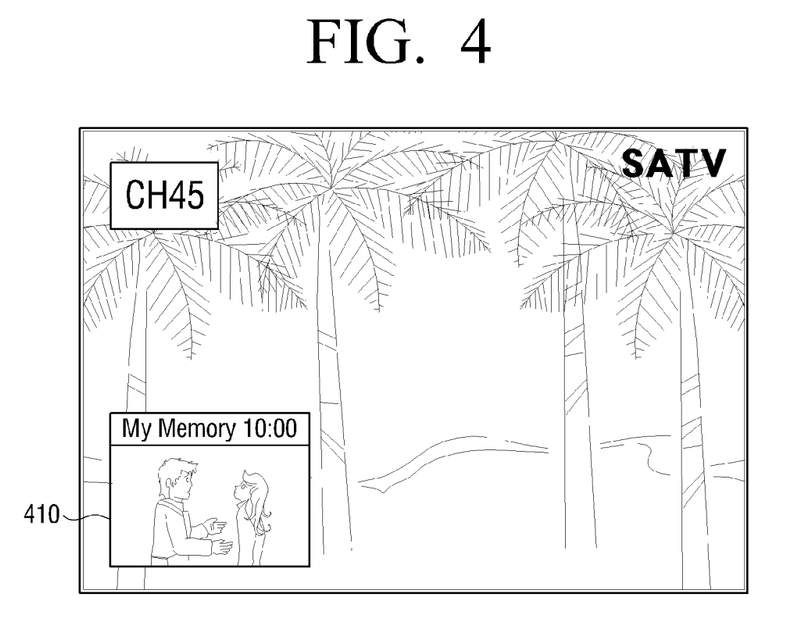
FIGS. 4 to 8 illustrate screens to explain methods for providing an appreciation object without temporally disturbing a user's viewing of a current viewing object, according to exemplary embodiments.

FIG. 4 exemplarily illustrates a screen to explain a method for providing an appreciation object 410 without covering a main part of a current viewing object. In FIG. 4, the appreciation object 410 is superimposed on the current viewing object in such a manner as not to cover the main part of the current viewing object, for example 1) center area, 2) broadcast station information display area (SATV), and 3) channel information display area (CH 45).

As shown in FIG. 4, 'My Memory' appearing on the appreciation object 410 indicates the title of the appreciation object 410, and '10:00' appearing next to the title indicates the total playback time of the appreciation object 410.

Additionally, to prevent the user's viewing of the current viewing object from being temporally disturbed, the appreciation object may be displayed in the same form as items appearing on the current viewing object so as not to cover the items. This situation is applicable to, for example, when an EPG screen or a screen showing a widget, an external input list or a menu is currently provided.

Figure 5:
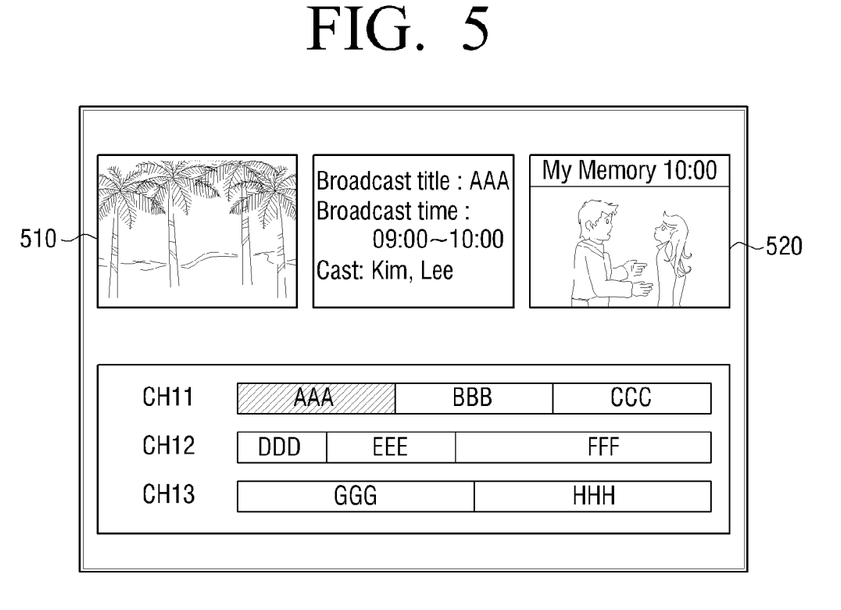

FIG. 5 exemplarily illustrates a screen on which an appreciation object 520 is displayed so as not to temporally disturb a user's viewing of an EPG screen which is currently provided. In FIG. 5, the appreciation object 520 is displayed in the same form as a current viewing object 510, in a reduced size, which is currently selected broadcast 'AAA', without covering the current viewing object 510. Accordingly, there is no inconvenience for a user to input desired manipulation while viewing the EPG screen.

Figure 6:
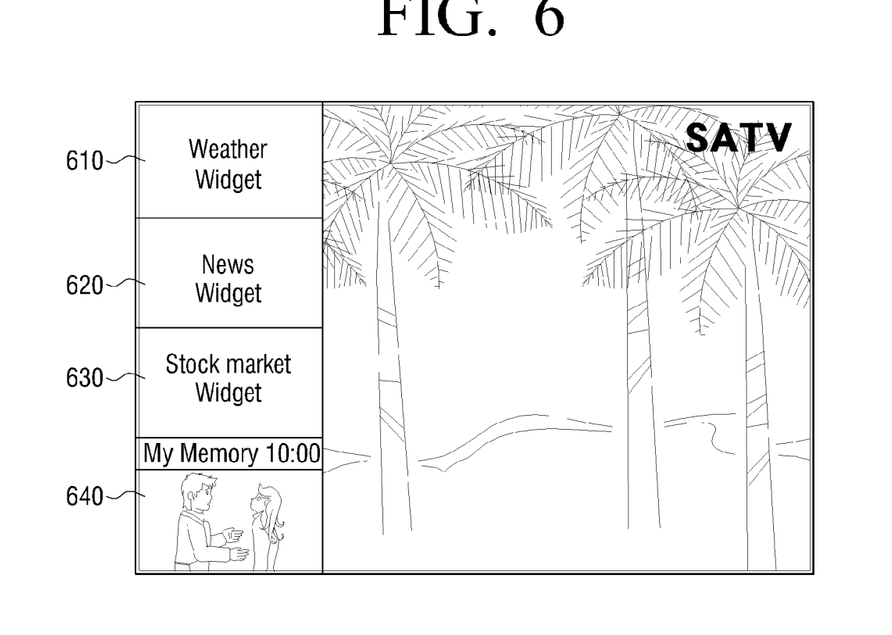

FIG. 6 exemplarily illustrates a screen on which an appreciation object 640 is displayed so as not to temporally disturb a user's viewing of a current viewing object on which three widgets 610, 620 and 630 are displayed. In FIG. 6, the appreciation object 640 is displayed in the same form as the three widgets 610, 620 and 630 without covering the three widgets 610, 620 and 630, and thus, there is no inconvenience for a user to view the three widgets 610, 620 and 630.

Figure 7:
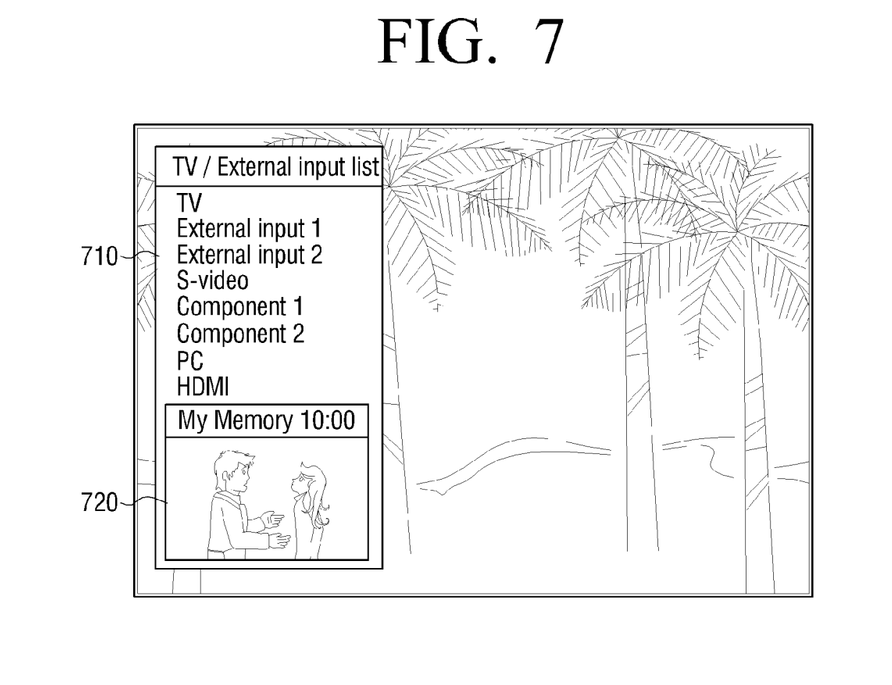

FIG. 7 exemplarily illustrates a screen on which an appreciation object 720 is displayed so as not to temporally disturb a user's viewing of a current viewing object on which a TV/external input list 710 is displayed. In FIG. 7, the appreciation object 720 is displayed on the TV/external input list 710 together with items arranged in the TV/external input list 710 without covering the items of the TV/external input list 710, and accordingly, there is no inconvenience for a user to perform manipulation while monitoring the TV/external input list 710. In this situation, the TV/external input list 710 comprises items such as TV, external input 1, external input 2, S-video, component 1, component 2, PC and HDMI.

Figure 8:
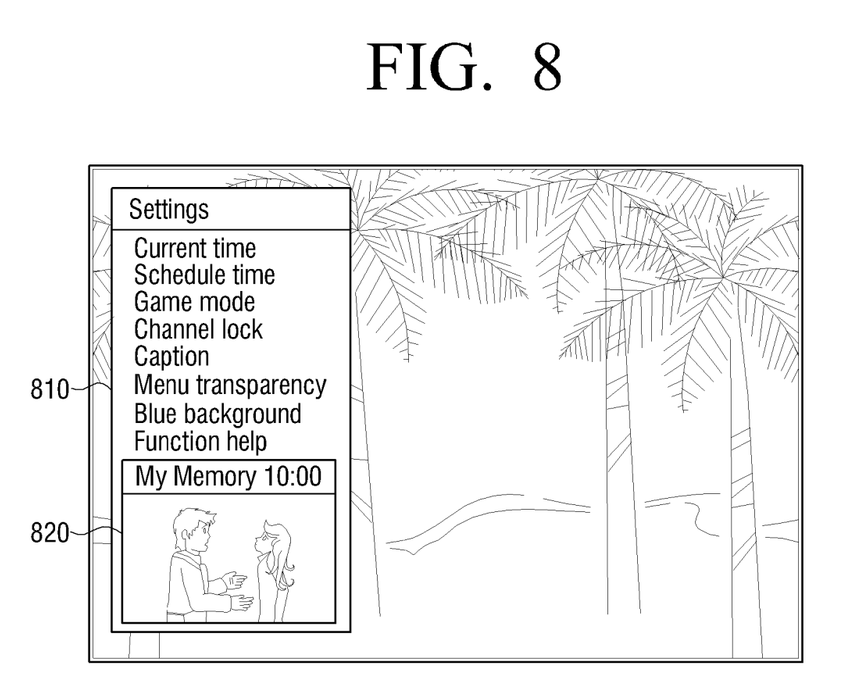

FIG. 8 exemplarily illustrates a screen on which an appreciation object 820 is displayed so as not to temporally disturb a user's viewing of a current viewing object on which a setting menu 810 is displayed. In FIG. 8, the appreciation object 820 is displayed on the setting menu 810 together with options in the setting menu 810 without covering the options, and accordingly there is no inconvenience for a user to perform manipulation while monitoring the setting menu 810. In this situation, the setting menu 810 comprises a plurality of options for setting a current time, a schedule time, a game mode, a channel lock, a caption, a menu transparency, a blue background and a function help.

To prevent the user's viewing of the current viewing object from being spatially disturbed, the appreciation object and the current viewing object may be provided individually. For example, an appreciation object may be provided during an interval between one broadcast screen and another broadcast screen which are continuously changed by channel zapping.

Figure 9:
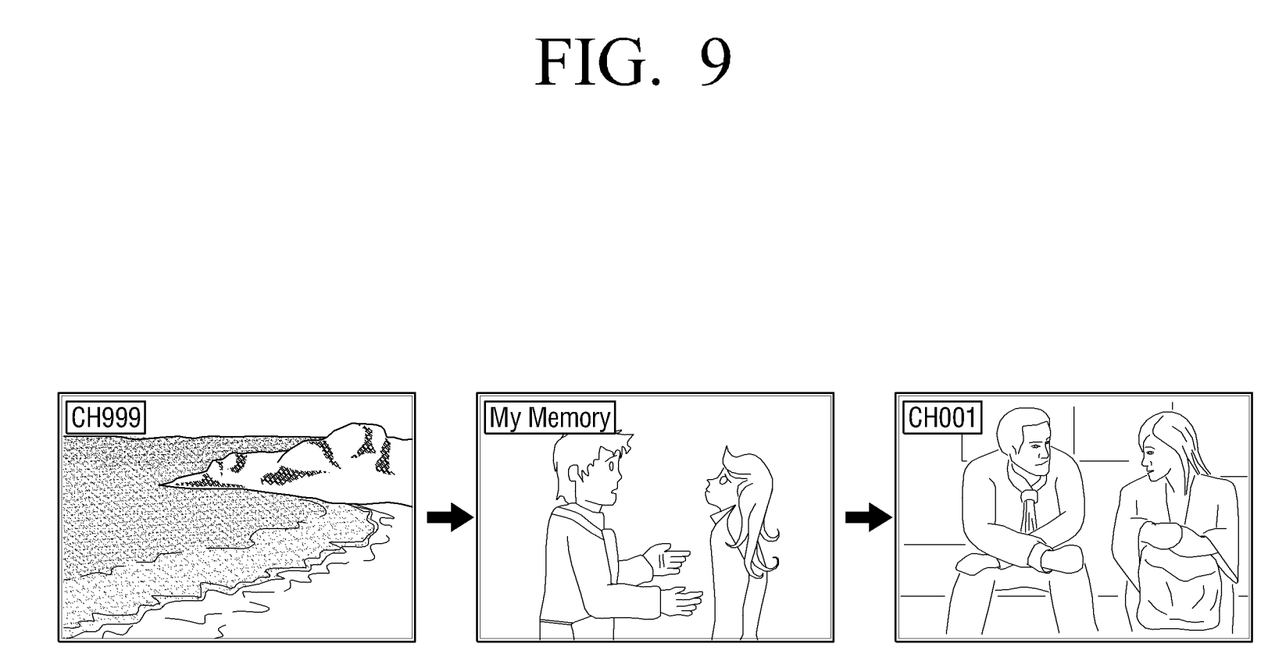
FIG. 9 illustrates a screen to explain a method for providing an appreciation object without spatially disturbing a user's viewing of a current viewing object, according to an exemplary embodiment.

As shown in FIG. 9, when channel 999 is changed to channel 001 during channel zapping, an appreciation object is displayed between broadcast content on channel 999 and broadcast content on channel 001, rather than the broadcast content on channel 999 being directly changed to the broadcast content on channel 001.

In other words, an appreciation object may be provided between scenes of a viewing object. Likewise, when zapping of external inputs or zapping of stored content is performed, an appreciation object may be provided between the external inputs or between the stored content.

The exemplary embodiments have been described in detail.

In the exemplary embodiment, the DTV may determine the user's interest according to the user manipulation. However, the present invention is also applicable to a situation in which the user's interest is determined according to a user's action. For example, if a predetermined pattern of a user's action is detected (for example, if a user closes his or her eyes or blinks or stretches himself or herself), the DTV may determine that the user's interest is low.

Additionally, the appreciation object comprises content stored in the storage unit 140 in the exemplary embodiment, but this is merely exemplary for convenience of description. Accordingly, it is possible to create an appreciation object using content which is stored in the external apparatus and is capable of being received via the external input unit 120, or using content obtainable from an external apparatus or an external network which is capable of being accessed via the communication interface 190.

Furthermore, the duration of the appreciation object is computed based on the time at which broadcast content is scheduled for viewing in operation S241 of FIG. 3, but this is merely exemplary. Accordingly, the present invention is also applicable to other situations. For example, if content stored in the storage unit 140 is scheduled for viewing, the duration of the appreciation object may be set based on the time at which the content begins to play back. Additionally, if a user selects a favorite broadcast, the duration of the appreciation object may be set based on the time at which the favorite broadcast begins.

When the DTV is powered off or in a standby mode, an appreciation object may be provided automatically. In this situation, the size of the appreciation object may be equal to or less than that of the DTV screen. Accordingly, the DTV may act as an electronic picture frame.

A single appreciation object is created and provided in the foregoing exemplary embodiments, but there is no limitation thereto. Accordingly, the present invention is equally applicable to a situation in which the number of appreciation objects created and provided exceeds two or three.

Additionally, the appreciation object is provided directly upon determining that the user is less interested in the current viewing object in the exemplary embodiment, but there is no limitation thereto. For example, upon determining that a user is less interested in a current viewing object, the DTV may provide a preview of the appreciation object to induce the user to appreciate the appreciation object. In this situation, the preview of the appreciation object may desirably be provided without disturbing the user's viewing of the current viewing object.

Subsequently, if the user agrees to appreciate the appreciation object after previewing the appreciation object, the DTV may provide the user with the appreciation object. Additionally, the DTV may display the appreciation object on a full screen in response to a user's request.

In the exemplary embodiment, if the remote controller 200 has a display function, the DTV may transfer an appreciation object to the remote controller 200 via the remote control communicator 195, so that the remote controller 200 may display the received appreciation object.

The remote controller 200 with the display function may be a remote controller with a touch screen or a remote controller with a display button.

Additionally, the DTV is merely an example of a video apparatus in the exemplary embodiment. Accordingly, the present invention is applicable to video apparatuses other than the DTV.

As described above, according to the exemplary embodiments, it is possible to induce a user to appreciate an appreciation object created using currently stored content, and to provide the user with entertainment through appreciation of the appreciation object. Additionally, it is possible to provide an appreciation object automatically without requiring user's intended input, thereby increasing user convenience.

Furthermore, since the appreciation object is provided when the user is less interested in a viewing object currently being provided, the provided appreciation object may enable the user to spend meaningful time. Moreover, the appreciation object is provided in such a manner as not to disturb the viewing of the viewing object, so it is possible to prevent unintended inconvenience which may be caused by the provided appreciation object.

The foregoing exemplary embodiments and advantages are merely exemplary and are not to be construed as limiting the present invention. The present teaching can be readily applied to other types of apparatuses. Also, the description of the exemplary embodiments o is intended to be illustrative, and not to limit the scope of the claims, and many alternatives, modifications, and variations will be apparent to those skilled in the art.

What is claimed is:

1. A method for providing a content using a video apparatus including a controller, a storage unit and a display screen, the method comprising:

determining, by the controller of the video apparatus, a user's interest in a content which is currently being displayed on the display screen of the video apparatus;

determining, by the controller of the video apparatus, whether to create a new application object if it is determined that the user's interest is less than a reference level;

creating, by the controller of the video apparatus, the new application object if it is determined to create the new application object and selecting, by the controller of the video apparatus, an application object from among a plurality of application objects previously stored in the storage unit of the video apparatus if it is determined not to create the new application object; and providing another content different from the currently displayed content on the display screen of the video apparatus if it is determined that the user's interest is less than the reference level, the another content being one of the new application object and the selected application object, wherein the determination comprises detecting, by the controller of the display apparatus, user action of browsing contents other than the currently displayed content.

2. The method as claimed in claim 1, wherein the determining comprises determining the user's interest while a user manipulates the video apparatus.

3. The method as claimed in claim 1, wherein the providing comprises providing the another content without temporally or spatially covering the currently displayed content on the display screen.

4. The method as claimed in claim 3, wherein the providing the another content without temporally or spatially covering the currently displayed content comprises at least one of the following:

providing the another content without covering a main part of the currently displayed content;

providing the another content without covering one or more items appearing on the currently displayed content; and displaying the another content on the display screen in a same form as the one or more items appearing on the currently displayed content.

5. The method as claimed in claim 3, wherein the providing the another content without temporally or spatially covering the currently displayed content comprises at least one of the following:

providing the another content between scenes of the currently displayed content;

providing the another content between pieces of broadcast content which are continuously changed by channel zapping;

providing the another content between pieces of content which are continuously changed by zapping of external inputs; and providing the another content between pieces of content which are continuously changed by zapping of stored content.

6. The method as claimed in claim 1, wherein the providing comprises, if it is determined that the user's interest is less than the reference level:

setting a duration of the providing the another content;
creating the another content based on the set duration; and
providing the created another content.

7. The method as claimed in claim 6, wherein the setting comprises setting the duration of the another content based on at least one of a period of time from a current time to a user's scheduled time and a previous appreciation time.

8. The method as claimed in claim 7, wherein the user's scheduled time is at least one of the following:

a time at which broadcast content scheduled for viewing begins;

a time at which another viewing content scheduled for viewing begins to play back; and a time at which the user's favorite broadcast content begins.

9. The method as claimed in claim 1, wherein it is determined that the user's interest is less than the reference level if at least one situation of the following is determined to have occurred:

a situation in which the user performs channel zapping;
a situation in which the user performs zapping of external inputs;
a situation in which the user performs zapping of stored content;
a situation in which the user performs manipulation which is not required to view the currently displayed content;
a situation in which the user manipulates an electronic program guide (EPG) for a predetermined period of time or longer; and
a situation in which a predetermined pattern of user action is detected.

10. The method as claimed in claim 1, wherein the another content comprises at least one content related to the user.

11. The method as claimed in claim 1, wherein the another content comprises at least one content which has a preference of the user greater than a first reference level and a recent appreciation frequency of the user less than a second reference level.

12. The method as claimed in claim 1, wherein the providing comprises:

inducing the user to appreciate the another content if it is determined that the user's interest is less than the reference level; and providing the another content if the user agrees to appreciate the another content.

13. The method as claimed in claim 1, wherein the providing comprises:

providing a preview of the another content on the display screen without temporally or spatially covering the currently displayed content on the display screen; and if the user selects to view the another content based on the preview, providing the another content on the display screen.

14. A video apparatus comprising:

a storage unit;
a video output unit which provides a content; and
a controller which determines a user's interest in the content which is currently being displayed by the video output unit, determines whether to create a new application object if it is determined that the user's interest is less than a reference level, creates the new application object if it is determined to create the new application object, selects an application object from among a plurality of application objects previously stored in the storage unit if it is determined not to create the new application object and controls the video output unit to provide another content different from the currently displayed content if it is determined that the user's interest is less than the reference level, the another content being one of the new application object and the selected application object, wherein the determining of the user's interest comprises detecting, by the controller, user action of browsing contents other than the currently displayed content.

15. The video apparatus as claimed in claim 14, wherein the controller controls the video output unit to provide the another content without temporally or spatially covering the currently displayed content.

16. The video apparatus as claimed in claim 15, wherein the video output unit provides the another content in at least one of the following manners:

a main part of the currently displayed content is not covered by the another content;

one or more items appearing on the currently displayed content are not covered by the another content; and the another content is displayed on the video output unit in a same form as the one or more items appearing on the currently displayed content.

17. The video apparatus as claimed in claim 15, wherein the video output unit provides the another content in at least one of the following manners:

the another content is provided between scenes of the currently displayed content;

the another content is provided between pieces of broadcast content which are continuously changed by channel zapping;

the another content is provided between pieces of content which are continuously changed by zapping of external inputs; and the another content is provided between pieces of content which are continuously changed by zapping of stored content.

18. The video apparatus as claimed in claim 14, wherein, if it is determined that the user's interest is less than the reference level, the controller sets a duration of providing the another content, creates the another content based on the set duration, and controls the video output unit to provide the created another content.

19. The video apparatus as claimed in claim 18, wherein the controller sets the duration of the another content based on at least one of a period of time from a current time to a user's scheduled time and a previous appreciation time.

20. The video apparatus as claimed in claim 19, wherein the user's scheduled time is at least one of the following:

a time at which broadcast content scheduled for viewing begins;

a time at which another viewing content scheduled for viewing begins to play back; and a time at which the user's favorite broadcast content begins.

21. A method for providing contents using a video apparatus including a controller, a storage unit and a display screen, the method comprising:

detecting, by the controller of the video apparatus, a user action of browsing contents other than a content currently displayed on the display screen of the video apparatus;

determining, by the controller of the video apparatus, whether to create a new application object if it is determined on the basis of the user action of browsing contents that a user's interest is less than a reference level;

creating, by the controller of the video apparatus, the new application object if it is determined to create the new application object, and selecting, by the controller of the video apparatus, an application object from among a plurality of application objects previously stored in the storage unit of the video apparatus if it is determined not to create the new application object; and providing another content different from the currently displayed content on the display screen of the video apparatus if it is determined that the user's interest is less than the reference level, the another content being one of the new application object and the selected application object.

* * * * *